United States Patent Office 2,697,668
Patented Dec. 21, 1954

2,697,668

METHOD FOR SETTLING PHOSPHOR SCREENS

Gilmore Erwin Crosby and John Adam Markoski, Lancaster, Pa., assignors to Radio Corporation of America, a corporation of Delaware No Drawing. Application June 23, 1950,
Serial No. 170,041

11 Claims. (Cl. 117—33.5)

This application is directed to the method of forming phosphor screens for cathode ray tubes and more specifically to the processing of a phosphor material to improve its adherence to the face plate of a cathode ray picture tube.

One essential part of a cathode ray tube constitutes a phosphor screen, which is normally deposited on the inner surface of a transparent flat portion, or face plate of the tube envelope. Conventionally, the television picture of such a tube is formed by a cathode ray beam, which is caused to scan the phosphor coated surface of the face plate in substantially a rectangular raster. The electron beam is density modulated, during its scanning, to provide a pattern of light and shadow which forms the television picture.

Such phosphor screens must be formed from an even distribution of the phosphor material in a very thin film over the inner surface of the transparent face plate. The most successful method of deposition of such phosphor screens is that in which the phosphor material is formed as a suspension in a solution of binder reagents formed as a pool over the surface of the face plate. This suspension of the phosphor is maintained quiescent, for a period of time, until the phosphor material has settled through the solution onto the surface of the face plate. This method of phosphor screen formation results in an even distribution of the phosphor material over the surface of the face plate and provides a uniform screen, which is so necessary and desirable for successful television picture reproduction. After the phosphor screen material has settled onto the face plate, the residual liquid in the cathode ray tube bulb is decanted slowly and without disturbing the settled screen.

It has been found necessary to let the cathode ray tube stand from one half to several hours before pouring in order to permit the settled phosphor materials to sufficiently adhere to the bulb surface so that the screen will not be disturbed during pouring. However, if the adherence of the phosphor material can be enhanced the time of screen settling, before pour off can be materially reduced, a substantial reduction of screen scrap due to jarred screens, phosphor slippage, phosphor separation, and avalanching of the phosphor material can be realized upon decanting of the supernatant liquid. Furthermore, it is desirable that screen adherence be obtained with smaller quantities of less expensive binder reagents in the settling pool. It is obvious that, if the desired results, listed above, can be realized, a considerable reduction in the cost of each tube can be made.

One way in which the settling and pouring-off time can be shortened, less screen scrap can be realized, and fewer settling reagents used, is by increasing the adherence of the phosphor material to the base member or face plate of the cathode ray tube during the settling time.

It is therefore an object of our invention to provide a phosphor material having a greater adherence to a supporting member.

It is a further object of our invention to provide a method of forming a phosphor screen having greater adherence of the screen to its supporting member.

It is another object of our invention to provide a phosphor material which, when settled from a liquid suspension provides greater adherence to the supporting base member.

It is another object of our invention to provide a phosphor material which can be settled onto a supporting member from a liquid suspension thereof by a method having a very short pour-off time.

It is a further object of our invention to provide a phosphor material which can be settled onto a supporting member from a suspension of the phosphor in a solution containing less than a normal amount of binder reagents.

Phosphor materials have been coated to promote free flow characteristics of the phosphor material. Such a coating as silicic acid will provide free flowing characteristics when dried around the phosphor. However, in accordance with our invention, we provide a coating about a phosphor material which will enhance the adherence of the phosphor material during the formation by settling of a phosphor screen from a solution containing a soluble silicate as the only component or as one of the components. We have found that the adherence of phosphor materials is improved by providing about the particles of the phosphor material such coatings, as phosphates of zinc, cadmium, magnesium, aluminum, cerium and lead; carbonates of barium and lead; magnesium oxide and hydroxide, and stannic acid. Of these, the phosphates of zinc and cadmium were among the best and shall be described herein.

One method of carrying out our invention is to wash a halide-fluxed phosphor with a soluble phosphate solution in order to form an insoluble phosphate precipitate about the phosphor crystals. Another method is that in which an insoluble gelatinous precipitate is deliberately formed about the phosphor crystals by the reaction of a soluble salt with a second solution providing an insoluble precipitate.

One well known phosphor mixture, which has been successfully used in television picture tubes, is a zinc sulfide phospor material activated by silver, and a zinc cadmium sulfide phosphor material activated by silver. The zinc sulfide phosphor, when struck by a cathode ray beam gives off a bluish colored luminescence, while the zinc cadmium sulfide phosphor gives off a yellowish luminescence. By an appropriate mixture of the two, in determinable amounts, it is possible to obtain a white colored luminescence, which is satisfactory for black and white television pictures.

As described above, the process of forming a phosphor screen for example, on the face plate of a cathode ray tube, is that in which the phosphor mixture of activated zinc sulfide and zinc cadmium sulfide is dispersed as a suspension in a liquid. A silicate, such as potassium or sodium silicate is dissolved in the phosphor suspension to act as a binding medium of the phosphor to the glass surface of the face plate, upon the drying of the phosphor screen after pouring. This liquid suspension is introduced into a cathode ray tube bulb in which the screen support or face plate portion of the bulb is maintained substantially horizontally. The phosphor materials are permitted, over a period of time, to settle onto the face plate of the tube to provide a uniform, thin film of phosphor. The supernatant liquid of the suspension is then poured out of the tube at a relatively slow rate to prevent disturbance of the phosphor screen by the act of pouring. The wet phosphor deposit is then air dried.

It has been found that unless sufficient time is allowed for the phosphor material to become adherent to the face plate, the screen will slip or be disturbed by the act of pouring. Accordingly, it has been found necessary usually to provide a settling time ranging from one hour to several hours, depending upon the phosphor materials used, the area of the screen surface, as well as the amount of phosphor per square unit of area deposited on the face plate of the tube. However, the above described white phosphor screen formed of zinc sulfide and zinc cadmium sulfide, is one in which the optimum settling time has been found to vary from one half to two hours, depending upon the amount of material deposited and the size of the bulbs. If the setting time can be drastically reduced, there will be a resultant saving in the cost of the manufacture of television tubes.

We have found that, if a precipitate is formed as a coating about the phosphor crystals prior to the process of settling, such coated phosphors will adhere to a greater extent in a shorter time to the face plate of the tube during the normal settling operation. Consequently, the supernatant liquid can be poured in a much shorter time, which has been determined to be in the order of 30 minutes.

Our invention will be described in relation to the phosphor mixture of activated zinc sulfide and zinc cadmium sulfide described above. The process of making silver activated zinc sulfide is well known. However, the following description is included in this disclosure to fully describe our invention.

The following specific method of making zinc sulfide phosphor is mentioned by way of example only. Furthermore, the particular method described is one of several, which may be used, and which are well known in the art.

Silver activated zinc sulfide phosphor material is formed from a mixture of a 1.5 normal solution of zinc sulfate and 0.015% silver (calculated from the ZnS yield) in the form of silver nitrate solution. Hydrogen sulfide gas is passed over this solution mixture to precipitate zinc sulfide and silver sulfide. After the precipitates are settled, the solution liquid is siphoned off and the precipitate washed several times by decantation, using distilled water for each wash. After washing, the precipitate mixture is dried at between 150° C. and 175° C.

To every 100 grams of the dry mixture of zinc and silver sulfide is added 3 grams of a sodium chloride and ammonium chloride flux mixture. This flux mixture is prepared by drying sodium chloride and ammonium chloride separately for a number of hours at a temperature between 150° C. and 175° C. The flux material is then ground to a fine powder and mixed in the ratio of 2 parts $NaCl$ and 1 part $NH_4Cl$, just before adding to the sulfide precipitate mixtures. The dried zinc and silver sulfides are thoroughly mixed with the sodium chloride and ammonium chloride flux mixture and then baked about 3 hours at substantially 390° C. to eliminate trapped gas. The phosphor and flux mixture is packed into crucibles fitted with lids and placed within a refractory container. The fluxed phosphor material is fired in a mildly reducing atmosphere at an increasing temperature varying from 900° C. to 1150° C. for several minutes. The ammonium chloride and sodium chloride fluxes react with the zinc sulfide to form zinc chloride. Although zinc chloride is volatile at the temperatures used, it is however, constantly formed and it is thus present in the final fired product. The purpose of the fluxing material in the preparation of this specific phosphor is to provide a liquid, or molten state or solution, which greatly accelerates the crystal formation of the phosphor.

The fluxing materials conventionally are removed by washing the fired phosphor several times in distilled water. In accordance with our invention, during this washing process, a phosphate precipitate can be formed about the fired phosphor crystals to provide greater adherence of the phosphor to a supporting member, when the phosphor is settled onto the member from a suspension of the phosphor in a silicate solution.

A gelatinous phosphate precipitate is formed by adding a phosphate solution to the fired phosphor material during the first washing step. This phosphate solution will react with zinc chloride in the phosphor mixture to form a precipitate. A typical phosphate solution which may be used is that resulting from dissolving 2432 grams of tri-sodium phosphate ($Na_3PO_4 \cdot 12H_2O$) in 16 liters of distilled water.

After cooling, the fired phosphor material, prepared as described above, is made into an aqueous suspension by mixing 100 grams of the phosphor in 1000 cc. of distilled water. While stirring, 9 cc. of the above prepared sodium phosphate solution is added slowly to the phosphor suspension. A gelatinous phosphate precipitate is formed from the reaction of the soluble phosphate with zinc chloride in the phosphor mixture. The stirring is continued for a few minutes. The phosphor and gelatinous precipitate settle together after which the supernatant liquid is poured off. The gelatinous precipitate mixes intimately with the phosphor particles and coats them. The treated phosphor is then washed several times in distilled water. The phosphate coated phosphor is then thoroughly dried for up to 12 hours at between 150° C. and 175° C. to drive off the water of hydration in the phosphate coating. Loss of water of hydration leaves the phosphate coating porous.

The zinc cadmium sulfide phosphor component of the above-described luminescent screen is also formed in a similar well known process. Briefly, this second phosphor material may be formed as follows. Zinc and cadmium sulfides are co-precipitated from a purified mixed solution of cadmium sulfate, zinc sulfate and silver nitrate in appropriate concentrations and proportions, by passing hydrogen sulfide gas into the solution mixture. The precipitates are separated from the supernatant liquid and washed by decantation several times in distilled water. The amount of materials in the mixture are substantially in the ratio of 1620 grams of cadmium sulfide, 1380 grams of zinc sulfide and around 300 milligrams of silver metal. After the mixed precipitates have been washed, 45 grams of sodium chloride and 30 grams of ammonium chloride are added to form a flux material during the firing of the phosphors. The mixture of these materials is dried at between 135° C. and 145° C. for about 24 hours. During the firing step, the sodium and ammonium chlorides will react with the part of the zinc and cadmium sulfides present to form zinc and cadmium chloride. To fire the phosphor material, the dried mixture is packed into silica crucibles and heated for several hours at around 200° C. to drive off traces of moisture and trapped gas. The crucibles are covered and placed within a refractory container. The fluxed phosphor material is fired in a mildly reducing atmosphere at temperatures which are gradually raised over a period of several minutes to substantially 1000° C. and kept at this temperature one hour or more. At the end of the firing schedule, the mixture is allowed to cool down to room temperature.

The fired zinc cadmium sulfide phosphor is now treated in a similar manner, as described above, to intimately coat a gelatinous phosphate precipitate on the phosphor crystals. A phosphate solution is formed from tri-sodium phosphate, as described above. Similarly, 9 cc. of the sodium phosphate solution is added slowly with stirring to a suspension of 100 grams of fired zinc cadmium sulfide phosphor material in 1000 cc. of distilled water. The stirring is continued for several minutes and the suspension and precipitates allowed to settle. The phosphate precipitates are, in a similar manner, formed from the reaction of the zinc and cadmium chloride in the phosphor suspension with the phosphate solution. The settled material is separated from the supernatant liquid and washed several times in distilled water. The phosphate coated phosphor is then thoroughly dried for substantially 12 hours at around 175° C. to drive off the water of hydration in the phosphate coating.

To insure the presence of a sufficient quantity of zinc ions during the coating process, it is beneficial to add 20 cc. of $ZnSO_4$ solution (10 grms. $ZnSO_4 \cdot 7H_2O$ per 100 cc.) for each 100 grams of phosphor material and before the sodium phosphate solution is added. This addition of $ZnSO_4$ solution is not always needed but depends on the quantities of zinc and cadmium chlorides formed during the firing of the phosphors.

The process of forming a fluorescent screen for a cathode ray tube from the above described phosphor material is briefly described below. The silver activated zinc sulfide phosphor and the silver activated zinc cadmium sulfide phosphor material are mixed together in an appropriate proportion to obtain a white luminescence under a cathode ray beam, and then formed into a suspension in a 1 normal sodium sulphate solution. This suspension may be formed in small batches by mixing substantially 50 grams of phosphor mixture in 300 cc. of sodium sulphate solution and ball-milling the mixture for about 20 minutes. To screen a 10″ diameter cathode ray tube bulb 190 cc. of the phosphor suspension having approximately 10 milligrams of solid material per cc. of solution, are mixed with an 1820 cc. water solution containing 100 cc. of 1 N sodium sulfate and 170 cc. of 12% potassium silicate (prepared from Philadelphia Quartz Kasil No. 1). This mixture is shaken vigorously and then rapidly poured into the cathode ray tube blank through an open end funnel equipped with a nozzle-like tip to cause an even dispersion of the liquid over the bulb and in a manner described in U. S. Patent 2,328,292 to Painter.

The phosphate coated phosphor material is allowed to settle from its suspension to form a finely dispersed phosphor layer at the bottom of the cathode ray tube blank. The supernatant liquid then may be poured off, in a relatively short time space of substantially 30 minutes, without disturbing the screen. Afterwards, the screen is dried to increase the adherence of the screen to the face plate of the tube.

The use of a coated phosphor material for forming screens has in practice reduced the settling time from ½ to ⅓. A reduction in screen scrap has also resulted.

Another advantage in the use of coated phosphors is a decided reduction in the quantities of the reagents required in the settling solution. It is true that less sodium sulfate and potassium silicate may be used in the settling solution with a proportionate increase in the settling time. But with coated phosphors, a reduction of the quantities of the reagents used is possible without lengthening the settling time. In practice it has been found that the quantities of the reagents used can be reduced in the order of one half. For example, if a screen is settled from the phosphor suspension in a solution of potassium silicate alone, the settling time will range from 6 hours to 16 hours. However, with a coated phosphor settled from a potassium silicate solution alone, the settling time can be reduced to one hour.

The following is a method, for example, of screen settling from a solution of potassium silicate alone. In settling a 10″ diameter screen, 1.8 grams of zinc phosphate coated phosphor material (zinc sulfide and zinc cadmium sulfide) is mixed as a suspension in 340 cc. of 12% potassium silicate solution (prepared from Philadelphia Quartz Kasil No. 1). The resulting suspension is added to the bulb through a funnel equipped with a spray nozzle, as described. The phosphor is allowed to settle and the supernatant liquid can be poured off after an hour. Without an insoluble phosphate coating upon the phosphor crystals, the settling time must be extended to several hours to prevent damage to the screen upon pouring.

The above described process of coating the phosphor material with a phosphate precipitate is one which has been successfully performed with the stated reduction in the settling time. However, the phosphor materials described above are those which are fired with a fluxing chloride material.

The zinc and cadmium phosphates, which are precipitated during the first washing step are voluminous and readily cover the phosphor particles. Further washing completely removes the flux but the insoluble phosphates remain coated on the phosphor particles. Sufficient zinc and cadmium chlorides are present in the fired product to yield to approximately 0.8 gram of dried phosphate precipitate to 100 grams of phosphor. We have found that the optimum concentration of zinc phosphate precipitate for best adherence, is between 0.6 and 0.8 gram of coating per 100 grams of phosphor (based on anhydrous zinc phosphate). However, concentrations beyond this range continue to enhance the adherence of the phosphor to the face plate of the tube. But, since the coating tends to reduce the efficiency of the phosphors, it is desirable to remain within the optimum range cited. Within this range of 0.6 and 0.8 gram of coating, per 100 grams of phosphor, the efficiency of the phosphor material is reduced approximately 5%. However, the advantages gained by the increased adherence of the phosphor material are worth the sacrifice in efficiency.

It is believed that the phosphor particles or crystals are actually coated with the gelatinous precipitate, since when a precipitate of zinc phosphate is formed in water, it will remain in suspension for hours. However, when zinc phosphate is suspended in water with a phosphor material, settling takes place relatively rapidly and the liquid becomes clear in less than an hour. This appears to indicate that the insoluble phosphate either coats or intimately joins with the phopshor particles and is carried down with them.

It is not necessary to form the gelatinous precipitate about the phosphor material by causing a chemical reaction with the fluxes present in the fired material. Coatings around the phosphor particles may also be formed by first removing the fluxing materials by thoroughly washing with water and then adding a soluble salt of the desired cation to a water suspension of the phosphor, followed by adding a soluble salt of the desired anion to form a precipitate with the cation. The mixture, consisting of a coating of the precipitate about the phosphor is then washed with water and dried in an oven. This last process may be used with such phosphor materials as zinc silicate, zinc selenide or any phosphor which is prepared with or without the use of fluxing materials. Examples are described below of this process of coating phosphors.

Also, extensive experimentation has indicated that besides the zinc phosphate and cadmium phosphate precipitates other gelatinous precipitates will improve the adherence of phosphors to a supporting member during the settling of the phosphor from a liquid suspension. We have found that such gelatinous precipitates as any one or a mixture of the phosphates of aluminum, magnesium, cadmium, cerium, and lead; the carbonates of barium and lanthanum; magnesium oxide and hydroxide, and stannic acid will form a coating about the particles of a phosphor material. When the coated phosphor is thoroughly dired and then settled as a screen from a suspension thereof in a soluble silicate, the adherence of the phosphor to the supporting member during the settling of screen was so materially improved that the settling time was greatly lessened. The above listed gelatinous precipitates were found to decrease the settling time for such phosphor materials as the copper and silver activated zinc sulfides and zinc-cadmium sulfides, zinc silicate (willemite), and zinc beryllium silicate.

In coating a phosphor material with the above listed phosphates of aluminum, magnesium, cadmium, cerium or lead, the following procedure can be followed: 100 grams of fired phosphor are slurried in one liter of water. To this slurry is added any one of the following combination of reagents which are previously made to the concentration of 10 grams of chemical per 100 gms. of water:

(1) 8 cc. $AlCl_3 \cdot 6H_2O$ + 12.4 cc. $Na_3PO_4 \cdot 12H_2O$
(2) 8.8 cc. $MgSO_4 \cdot 7H_2O$ + 9.2 cc. $Na_3PO_4 \cdot 12H_2O$
(3) 6 cc. $CdSO_4 \cdot 8/3H_2O$ + 5.6 cc. $Na_3PO_4 \cdot 12H_2O$
(4) 4.8 cc. $Ce(NO_3)_3 \cdot 6H_2O$ + 4 cc. $Na_3PO_4 \cdot 12H_2O$
(5) 4.8 cc. $Pb(NO_3)_2$ + 3.6 cc. $Na_3PO_4 \cdot 12H_2O$ The reagent on the left is added first, and then with stirring, the volume of trisodium phosphate solution is added slowly, thus precipitating a coating about the phosphor. The resulting slurry is filtered, the cake reslurried with 500 cc. of water, five times, and filtered each time. The coated phosphor (the cake) is dried between 110°–170° C., sieved through a 250 mesh screen and is ready for the tube settling procedure.

Stannic acid can be used to coat a phosphor material, for example, by adding 7.6 cc. of $SnCl_2$ solution (10 gms. $SnCl_2 \cdot 5H_2O$ per 100 cc. $H_2O$) to a one liter water slurry containing 100 gms. of phosphor. With stirring, 4.8 cc. of KOH solution (10 gms. KOH per 100 cc. $H_2O$) are added and the solution is made just acid with $HNO_3$. The resulting coated phosphor is washed, dried, and sieved similar to those mentioned in the previous paragraph.

To coat a phosphor with a hydroxide of magnesium, these steps can be followed: 7 cc. of $MgSO_4$ solution (10 gms. $MgSO_4 \cdot 7H_2O$ per 100 cc. $H_2O$) are added to the phosphor slurry (100 gms. phosphor per liter $H_2O$). With stirring, 8 cc. of KOH solution (10 gms. KOH per 100 cc. $H_2O$) are added slowly. The resulting coated phosphor is washed, dried in a desiccator, and sieved. To give a magnesium oxide coating, the coated phosphor is dried around 170° after washing.

To coat a phosphor with a carbonate of barium or lanthanum, this procedure can be used: 17.6 cc. of $Ba(NO_3)_3$ solution (10 gms. $Ba(NO_3)_3$ per 100 cc. ($H_2O$) or 8.8 cc. of $La(NO_3)_3$ solution (10 gms. $La(NO_3)_3$ per 100 cc. $H_2O$) are added to a phosphor slurry (100 gms. phosphor per 1000 cc. $H_2O$). With stirring, 8 cc. of $NH_4HCO_3$ (10 gms. $NH_4HCO_3$ per 100 cc. $H_2O$) are added slowly. The resulting coated phosphor is washed, dried, and sieved, similar to those phosphors coated with phosphate.

It is not clearly understood just why a phosphor material coated with a gelatinous precipitate as described above should have an increased adherence and should result in a shorter settling time during screen formation. It may be that one or more things are taking place. It may be that the gelatinous precipitates have good adherence properties because of their porous character after loss of water of hydration during the drying step. Being porous, the coating tends to absorb reagents in the settling solutions such as potassium silicate, thus concentrating the reagents about the phosphor where they are needed to promote adherence. Another possibility is that precipitated coatings have minute electrical charge in suspension, which is opposite to the charge on the sulfides in suspension. Thus, the coatings tend to cling to the phosphor and attract any electrolytes and/or binding agents, thus causing different reagents to become more concentrated about the particles and causing better adherence. Also, the coating materials in solution might have a minute electrical charge, which is opposite to the charge on the glass surface of the screen supporting member, thus causing adherence due to electrical attraction. In any case, whatever the explanation of this phenomena, it is a fact that screen adherence is greatly improved and a much shorter settling time results, with the described advantages. The above theories are presented as possible explanations and should not be considered as binding.

The above described process of improving phosphor screen adherence during screen settling has been described as using a settling solution of a soluble silicate together with an electrolyte of sodium sulfate. We have found that the process need not be limited to these materials in the settling solution. As mentioned above, screen adherence is greatly improved in screen settling from a solution of a soluble silicate alone. Also, we have found that other electrolytes such as potassium sulfate and barium acetate, for example, can be used in place of the sodium sulfate electrolyte in the settling solution. Furthermore, mixtures of these electrolytes in the settling solution are, for example, sodium or potassium chlorides and sodium, potassium or barium nitrate. It is not necessary to limit the coating process to the phosphor screen materials described, as such precipitates will greatly increase the adherence of any phosphor material.

While certain specific embodiments have been described, it will be understood that various changes and modifications may be made therein without departing from the spirit and scope of the invention.

We claim:

1. The method of forming a screen of phosphor material on a supporting member, said method comprising the steps of, forming a suspension of said phosphor material in water, mixing in said suspension a soluble phosphate with a soluble compound having cations which will form with the phosphate ions an insoluble phosphate precipitate to intimately mix with said phosphor material, drying said phosphor and phosphate mixture, and settling said phosphate and phosphor mixture from a suspension thereof in an aqueous silicate solution onto said supporting member.

2. The method of forming on a supporting member a screen of zinc sulfide and zinc cadmium sulfide material, firing said phosphor material with a fluxing mixture of sodium and ammonium chlorides, washing said fired material with a solution of trisodium phosphate to form an intimate mixture of the precipitates of zinc phosphate and zinc cadmium phosphate and said fired material, drying said mixture, and settling said mixture from a suspension thereof in an aqueous silicate solution onto said supporting member.

3. The method of forming on a supporting member a luminescent screen from a phosphor material and an insoluble phosphate selected from the group of phosphates consisting of zinc, cadmium, aluminum, cerium and lead, said method comprising the steps of, forming an aqueous suspension of said phosphor material, forming an insoluble precipitate of the selected one of the above metal phosphates within said phosphor suspension by mixing in said suspension a soluble phosphate with a soluble compound having a cation of the selected phosphate to form an intimate mixture of the phosphate precipitate with the suspended phosphor material, removing the water of said suspension, drying said mixture of phosphor and phosphate precipitate until the water of hydration of said phosphate precipitate is driven off, settling said phosphor and phosphate precipitate mixture from a suspension thereof in an aqueous silicate solution onto said supporting member.

4. The method of forming on a supporting member a luminescent screen from a phosphor material and an insoluble phosphate selected from the group of phosphates consisting of zinc, cadmium, aluminum, cerium and lead, said method comprising the steps of, forming an aqueous suspension of said phosphor material, forming an insoluble precipitate of more than one of the above metal phosphates within said phosphor suspension by mixing in said suspension a soluble phosphate and a soluble compound having a cation of the phosphate selected from said group to form an intimate mixture of the phosphate precipitate with the suspended phosphor material, removing the water of suspension, drying said mixture of phosphor and phosphate precipitate until the water of hydration of said phosphate precipitate is driven off, forming a suspension of said dried phosphor and phosphate precipitate mixture in an aqueous solution of a soluble silicate, settling said phosphor and phosphate precipitate mixture onto said supporting member to form a luminescent screen, removing the supernatant liquid of the suspension.

5. The method of forming on a supporting member a luminescent screen from a phosphor material from one of the insoluble phosphates of the group consisting of zinc, cadmium and mixtures thereof, said method comprising the steps of, forming a suspension of said phosphor material in water, forming an insoluble precipitate of said phosphate in said water suspension by mixing in said suspension a soluble phosphate with a soluble compound having the cation of the phosphate selected from said group to intimately mix with said phosphor material, drying said phosphor and phosphate mixture until the water of hydration of said phosphate precipitate is driven off, and settling said phosphor and phosphate mixture from a suspension thereof in an aqueous solution of a soluble silicate and one of the group of electrolytes consisting of, $Na_2SO_4$, $K_2SO_4$ and Ba acetate onto said supporting member.

6. The method of forming on a supporting member, a luminescent screen from a phosphor material and an insoluble phosphate of aluminum, said method comprising the steps of, forming a suspension of said phosphor material in water, forming an insoluble aluminum phosphate precipitate in said water solution by mixing in said suspension a soluble phosphate compound with a soluble aluminum compound to intimately mix the aluminum phosphate precipitate with said phosphor material, drying said phosphor and phosphate mixture until the water of hydration of said aluminum phosphate precipitate is driven off, and settling said phosphor and phosphate mixture from a suspension thereof in an aqueous solution of a soluble silicate and an electrolyte onto said supporting member.

7. The method of forming on a supporting member, a luminescent screen from a phosphor material and an insoluble phosphate of lead, said method comprising the steps of, forming a suspension of said phosphor material in water, forming an insoluble lead phosphate precipitate in said water solution by mixing in said suspension a soluble phosphate compound with a soluble lead compound to intimately mix said lead phosphate precipitate with said phosphor material, drying said phosphor and phosphate mixture until the water of hydration of said lead phosphate precipitate is driven off, and settling said phosphor and phosphate mixture from a suspension thereof in a solution of a soluble silicate and an electrolyte onto said supporting member.

8. The method of forming on a supporting member a screen of a zinc sulfide phosphor material, said method comprising the steps of, forming an aqueous suspension of said zinc sulfide and a water-insoluble phosphate selected from the group of phosphates consisting of zinc, cadmium, aluminum, cerium and lead by mixing in said suspension a soluble phosphate with a soluble compound having a cation of the selected phosphor to form an intimate mixture of the phosphate precipitate with the suspended phosphor material, removing the water of said suspension, drying the mixture of the phosphor and insoluble phosphate until the water of hydration of said phosphate is driven off, settling onto said supporting member said phosphor and phosphate mixture from a second suspension thereof in an aqueous solution of potassium silicate, removing the liquid of said second suspension, and drying said settled mixture to form said screen.

9. The method of forming on a supporting member a screen of a zinc-cadmium sulfide phosphor material, said method comprising the steps of, forming an aqueous suspension of said zinc-cadmium sulfide and a water-insoluble phosphate selected from the group of phosphates consisting of zinc, cadmium, aluminum, cerium, and lead by mixing in said suspension a soluble phosphate with a soluble compound having a cation of the selected phosphor to form an intimate mixture of the phosphate precipitate with the suspended phosphor material, removing the water of said suspension, drying the mixture of the phosphor and insoluble phosphate at around 175° C. until the water of hydration of said phosphate is driven off, settling onto said supporting member said phosphor and phosphate mixture from a second suspension thereof in an aqueous solution of potassium silicate, removing the liquid of said second suspension, and drying said settled mixture to form said screen.

10. The method of forming a luminescent screen in accordance with claim 1 in which the cations of the soluble compound are zinc ions.

11. The method of forming a luminescent screen in accordance with claim 1 in which the cations of the soluble compound are zinc and cadmium ions.

References Cited in the file of this patent

UNITED STATES PATENTS

| Number | Name | Date |
| --- | --- | --- |
| 2,227,305 | Grossman | Dec. 31, 1940 |
| 2,252,590 | Wolfson | Aug. 12, 1941 |
| 2,412,654 | Sadowsky | Dec. 17, 1946 |
| 2,451,590 | Tidik et al. | Oct. 19, 1948 |
| 2,487,097 | Byler | Nov. 8, 1949 |